US008565156B2

(12) United States Patent  
Bergman (10) Patent No.: US 8,565,156 B2  
(45) Date of Patent: Oct. 22, 2013

(54) BASE STATION, METHOD, COMPUTER PROGRAM AND COMPUTER PROGRAM PRODUCT FOR IMPROVED RANDOM ACCESS (75) Inventor: Petter Bergman, Ljungsbro (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 249 days.

(21) Appl. No.: 13/052,528

(22) Filed: Mar. 21, 2011

(65) Prior Publication Data

US 2012/0236737 A1 Sep. 20, 2012

(30) Foreign Application Priority Data

Mar. 14, 2011 (EP) ..................................... 11158072

(51) Int. Cl.
  *H04W 4/00* (2009.01)
(52) U.S. Cl.
  USPC ......................................................... 370/328
(58) Field of Classification Search
  None
  See application file for complete search history.

(56) References Cited

U.S. PATENT DOCUMENTS

| 7,312,711 | B2* | 12/2007 | Fong et al. .................. 340/573.4 |
| 2004/0014452 | A1* | 1/2004 | Lim et al. ...................... 455/403 |
| 2006/0121855 | A1* | 6/2006 | Dillon ............................. 455/69 |
| 2011/0039499 | A1* | 2/2011 | Zhang et al. ............... 455/67.11 |
| 2011/0070874 | A1* | 3/2011 | Dominguez Romero et al. ............................ 455/418 |

* cited by examiner

*Primary Examiner* — Minh-Trang Nguyen  
(74) *Attorney, Agent, or Firm* — Coats & Bennett, P.L.L.C.

(57) ABSTRACT

A base station as presented herein improves random access. The base station comprises a radio unit comprising a transceiver and an antenna; a message receiver arranged to receive random access preamble messages with a preamble, from mobile communication terminals, on a random access channel; a distance determiner arranged to, for each random access preamble message, determine whether the corresponding mobile communication terminal is further away than an outer threshold distance from the radio unit; and a radius adjuster arranged to, when it is determined that there is more than a threshold magnitude of mobile communication terminals being further away than the outer threshold distance, increase the outer threshold distance and a random access cell radius of the radio unit. In other words, when many mobile communication terminals are determined to be far away, the random access cell radius is increased, allowing dynamic resizing of the random access cell.

19 Claims, 7 Drawing Sheets

BASE STATION, METHOD, COMPUTER PROGRAM AND COMPUTER PROGRAM PRODUCT FOR IMPROVED RANDOM ACCESS

RELATED APPLICATIONS

This application claims priority to European application no. EP11158072.6, which was filed 14 Mar. 2011 and is incorporated herein by reference in its entirety.

TECHNICAL FIELD

The invention relates to a base station of a mobile communication system and more particularly to improving random access to such a base station.

BACKGROUND

In mobile communication networks, such as LTE (Long Term evolution), random access channels are used by mobile communication terminals to start communication with a base station using a cell of the base station. The mobile communication terminal initiates this by sending a preamble, consisting of a number of symbols, on the random access channel (which is common to all such initiation for the cell) with a preamble id (RAPID) between 0 and 63 selected from a group of preambles which are valid for the cell of the base station. In LTE, for the same cell, the valid preambles use a finite set of symbol sequences (root sequences) but different preambles using the same symbol sequence are cyclically shifted from each other by a number of symbols.

A delay occurs for the transmission of the preamble from the mobile communication terminal to the base station. This delay can be measured in the number symbols of the sequence. If, due to a distance between the mobile communication terminal and the base station, the propagation delay is larger than a shift between two valid preambles, the base station can interpret the preamble with the wrong preamble id. In this case, the set up procedure fails, whereby the mobile communication terminal needs to try again with the same or different base station cell. This can lead to longer set up times, failed handovers, etc.

It is thus desired to have a large random access cell size to allow for longer delays and fewer failed set up procedures. On the other hand, it is desired to have a small random access cell size to prevent preamble confusion between neighbouring random access cells. By using small cells, more preambles are available in the system with reduced risk of the same preamble being used in neighbouring cells. It is thus difficult to find the right balance to determine an acceptable cell size.

Previously, this cell size has been set during network planning.

SUMMARY

An object of the invention is to provide the ability to adjust random access cell size depending on the location of mobile communication terminals.

A first aspect is a base station for improved random access. The base station comprises a radio unit comprising a transceiver and an antenna; a message receiver arranged to receive random access preamble messages, each random access preamble message comprising a respective preamble, from mobile communication terminals, on a random access channel; a distance determiner arranged to, for each random access preamble message, determine whether the corresponding mobile communication terminal is further away than an outer threshold distance from the radio unit; and a radius adjuster arranged to, when it is determined that there is more than a threshold magnitude of mobile communication terminals being further away than the outer threshold distance, increase the outer threshold distance and a random access cell radius of the radio unit. In other words, when many mobile communication terminals are determined to be far away, the random access cell radius is increased, allowing dynamic resizing of the random access cell.

The distance determiner may be further arranged to, for each random access preamble message, determine whether the corresponding mobile communication terminal is further away than an inner threshold distance from the radio unit, the inner threshold distance being shorter than the outer threshold distance; and the radius adjuster may be further arranged to, when it is determined that there is less than a threshold magnitude of mobile communication terminals being further away than the inner threshold distance, reduce the inner threshold distance, the random access cell radius of the radio unit and the outer threshold distance. In other words, when many mobile communication terminals are determined to be near the radio unit, the random access cell radius is decreased, allowing dynamic resizing in both directions of the random access cell.

Each preamble may comprise a preamble sequence selected from a predefined number of preamble sequences being valid for the radio unit, and wherein all valid preamble sequences are cyclic shifts with a multiple of a shift size, being valid for the radio unit, of a root sequence for the radio unit. The shift size can be used by the radio adjuster to adjust the random access cell size.

A second aspect is a method for improved random access, executed in a base station comprising a radio unit comprising a transceiver and an antenna. The method comprises the steps of: receiving random access preamble messages, each random access preamble message comprising a respective preamble, from mobile communication terminals, on a random access channel; for each random access preamble message, determining whether the corresponding mobile communication terminal is further away from the radio unit than an outer threshold distance; and when it is determined that there is more than a threshold magnitude of mobile communication terminals being further away than the outer threshold distance, increasing the outer threshold distance and a random access cell radius of the radio unit.

The method may further comprise the steps of: for each random access preamble message, determining whether the corresponding mobile communication terminal is further away than an inner threshold distance from the radio unit, the inner threshold distance being shorter than the outer threshold distance; and when it is determined that there is less than a threshold magnitude of mobile communication terminals being further away than the inner threshold distance, reducing the inner threshold distance, the random access cell radius of the radio unit and the outer threshold distance.

Each preamble may comprise a preamble sequence selected from a predefined number of preamble sequences being valid for the radio unit, and wherein all valid preamble sequences are cyclic shifts of a root sequence for the radio unit.

At least part of the preamble sequences may be cyclic shifts with a multiple of a shift size being valid for the radio unit.

The random access cell radius may be determined by the shift size. In other words, the random access cell radius of the radio unit and optionally the outer threshold distance can be increased or decreased by adjusting the shift size.

The outer threshold distance may be the random access cell radius of the radio unit.

The step of determining whether the mobile communication terminal is further away than an outer threshold distance may comprise the steps of: as a response to each random access preamble message, sending a first response message comprising a first preamble identifier matching a preamble identifier of the preamble of the respective random access preamble message when the respective mobile communication terminal is closer than the random access cell radius; as a response to at least part of said preamble messages, sending a second response message comprising a second preamble identifier matching a preamble identifier of the preamble of the respective random access preamble message when the respective mobile communication terminal is further away than the cell radius; and determining that that a respective mobile communication terminal is further away than an outer threshold distance when the respective mobile communication terminal responds to the second response message.

The preamble sequence associated with the second preamble identifier may be shifted from the preamble sequences associated with the first preamble identifier by a number of symbols being the shift size.

The step of determining whether the mobile communication terminal is further away than an outer threshold distance may only be performed for random access preamble messages comprising a preamble sequence being a cyclical shift of the root sequence with a multiple of the shift size.

The outer threshold distance may be less than the random access cell radius of the radio unit.

The step of determining whether the mobile communication terminal is further away than an outer threshold distance may comprise the step of: determining the distance between the respective mobile communication terminal and the radio unit by measuring a respective delay.

A third aspect is a computer program for improved random access using a base station comprising a radio unit comprising a radio unit and an antenna. The computer program comprises computer program code which, when run on a base station, causes the base station to: receive random access preamble messages, each random access preamble message comprising a respective preamble, from mobile communication terminals on a random access channel; for each random access preamble message, determine whether the corresponding mobile communication terminal is further away from the radio unit than an outer threshold distance; and when it is determined that there is more than a threshold magnitude of mobile communication terminals being further away than the outer threshold distance, increase the outer threshold distance and a random access cell radius of the radio unit.

A fourth aspect is a computer program product comprising a computer program according to the third aspect and a computer readable means on which the computer program is stored.

It is to be noted that any feature of the first, second, third and fourth aspects may, where appropriate, be applied to any other of these aspects.

Generally, all terms used in the application are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Figure 1:
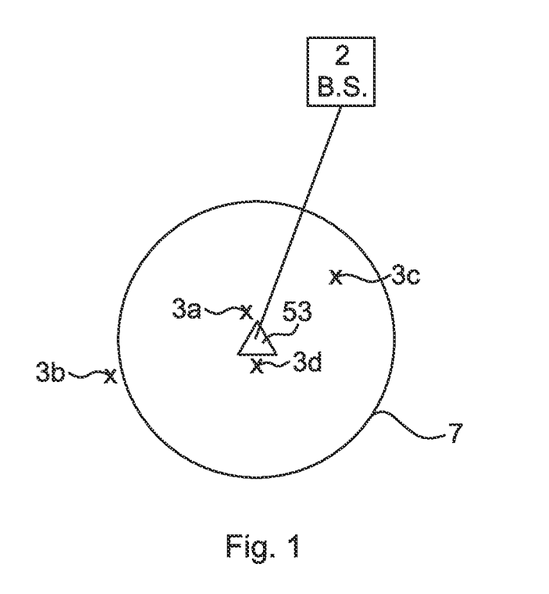
FIG. 1 is a schematic diagram illustrating an environment where embodiments presented herein can be applied.

FIG. 1 is a schematic diagram illustrating an environment where embodiments presented herein can be applied.

A base station 2 is connected to a radio unit 53, which in turns comprises a transceiver and antenna (see FIG. 7A below) for radio communication with mobile communication terminals 3a-d. The base station 2 and radio unit 53 can optionally be co-located. Regardless whether the radio unit 53 is co-located with or separately located from the base station 2, the radio unit 53 can be considered to be part of the base station 2. While only one radio unit 53 is shown here, any suitable number of radio units can be controlled by each base station 2. For instance, in many cases three radio units 53 are under the control of a single base station 2. A random access cell radius 7, defined by a distance from the radio unit 53 defines an area within which a random access channel can be used when mobile communication terminals are to initiate communication with the radio unit 53 and base station 2, in order to gain access to a mobile communication network to which the base station 2 belongs. This can be used during initial attach, when the mobile communication terminal connects, at handover, when the mobile communication terminal needs to be scheduled for uplink transmission or any other situation when the mobile communication terminal needs to establish a connection with a base station.

The mobile communication network can comply with Long Term Evolution, LTE, standard of 3rd Generation Partnership Project, 3GPP or any other applicable standard. Furthermore, aspects disclosed herein could also in part or entirety the mobile communication network being W-CDMA (Wideband Code Division Multiple Access), GSM (Wideband Code Division Multiple Access), etc. Hereinafter, references are on occasion made to messages according to LTE for completeness sake, but it is to be noted that this does not restrict the embodiments, which can be applied to any applicable standard.

Figure 2:
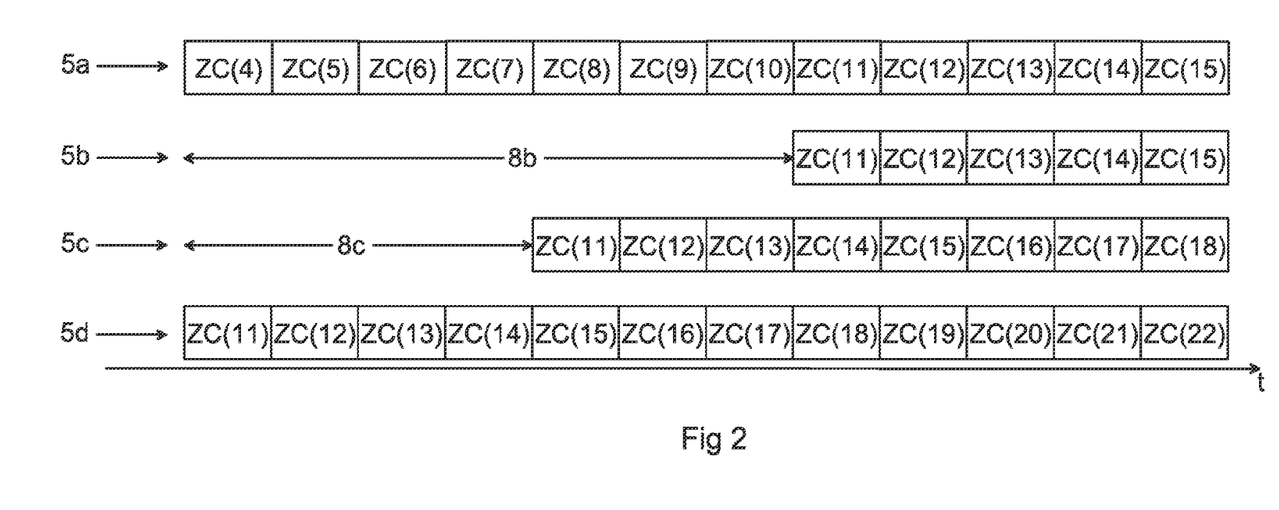
FIG. 2 is a schematic diagram illustrating the use of preamble sequences for the mobile communication terminals of FIG. 1.

FIG. 2, which is a schematic diagram illustrating the use of preamble sequences during random access for the mobile communication terminals of FIG. 1. References here will be made to both FIG. 1 and FIG. 2.

Random Access Preambles

In EUTRA (evolved UMTS (Universal Mobile Telecommunications System) Terrestrial Radio Access Network), the air interface for LTE, a mobile communication terminal contacts the base station by a random access procedure starting with that the mobile communication terminal sends a preamble on a resource block allocated to the Physical Random Access Channel (PRACH). This can occur at initial attach, when the mobile communication terminal connects, at handover, when the mobile communication terminal needs to be scheduled for uplink transmission or any other situation when the mobile communication terminal needs to establish a connection with a base station.

The random access preamble consists of a cyclic prefix of length $T_{CP}$ and a sequence part of length $T_{SEQ}$, where $T_{CP}$ and $T_{SEQ}$ is defined in ref [1] and is different depending on the configured preamble format. Herein an example is disclosed where preamble format 0 is used, but the presented embodiments are also applicable for the other preamble formats.

The preamble sequence consists of $N_{ZC}$ (for preamble format 0 $N_{ZC}$=839) complex values (y(0) . . . y(838)), each corresponding to one symbol. This sequence is derived from a standardized set of 838 Zadoff-Chu (ZC) root sequences numbered 0 to 837. Each ZC root sequence can be cyclically shifted to obtain more valid preambles.

A cell allows 64 valid preambles with different random access preamble id (RAPID) ranging from 0 to 63. $N_{CS}$ is the shift size defined for the cell, which defines the valid preambles. For each cell, the first root sequence number and the shift size $N_{CS}$ is defined, and this information is available both for the mobile communication terminal (through broadcast) and the base station. The base station and the mobile communication terminal can then independently derive the sequence for each valid RAPID.

The root-sequence ZC(0), ZC(1), ZC(2) . . . ZC(838) can be cyclically shifted with steps of $N_{CS}$ to produce different valid preambles. If, for example, $N_{CS}$ is 13, the following sequences are examples of valid sequences:

ZC(0), ZC(1), ZC(2) . . . ZC(838)
ZC(13), ZC(14), ZC(15) . . . ZC(838), Z(0) . . . ZC(12)
ZC(26), ZC(27), ZC(28) . . . ZC(838), Z(0) . . . ZC(25)

RAPID 0 corresponds to the first root sequence. RAPID 1 corresponds to the first root sequence, shifted with $N_{CS}$, RAPID 2 correspond to the first root sequence, shifted with $2*N_{CS}$, etc, until all possible shifts are used. Then, the next set of sequences is produced from next root sequence, until all 64 RAPID values are associated with a sequence.

In this way, the mobile communication terminal and the base station can derive the root sequence number and cyclic shift of each valid preamble using the formulas in ref [1]. Let us call these procedures F and F':

$$[n, v]=F(RAPID, l_0, N_{CS})$$

$$RAPID=F'(n, v, l_0, N_{CS})$$

Where n is the root sequence number, v is the cyclic shift and $l_0$ is the logical number of first root sequence.

The value of $N_{CS}$ is selected to depend on the random access cell size. The value of $N_{CS}*T_S$ (where $T_S$ is the time to send one random access symbol) shall be higher than the highest possible round-trip delay. Analogously, the size of the random access cell can be adjusted by adjusting the value of $N_{CS}$.

In LTE, a limited set of $N_{CS}$ values are used, covering different cell sizes, from about 1 km to 120 km radius.

When received in the base station, a preamble is recognized using a correlation mechanism that is robust against noise and interference and also will detect partial preambles. The correlation mechanism reports which root sequence is used, and the shift j of the root sequence. This shift is caused by a combination of the cyclic shift of the root sequence done by the mobile communication terminal to produce a preamble and the round-trip delay $T_{delay}$.

The shift can be expressed as $j=v*N_{CS}-T_{delay}/T_S$, where v is the cyclic shift index, of the actual root sequence.

The base station will use the shift j to calculate both v and $T_{delay}$, assuming that $T_{delay}$ is less than $N_{CS}*T_S$. A preamble with a roundtrip delay $T_{delay}$ which is greater than $N_{CS}*Ts$ will be erroneously identified with wrong $T_{delay}$, v and consequently wrong RAPID.

The formulas used are:

$$v=ceil(j/N_{CS})$$

$$T_{delay}=(-j \bmod N_{CS})*T_S$$

where ceil(x) is x rounded upwards to the nearest larger integer.

Now with reference to FIG. 2, preambles 5a-d correspond to preambles received in the base station from mobile communication terminals 3a-d, respectively, each comprising values of a valid Zadoff-Chu sequence for a cell. Mobile communication terminals 3a and 3d, being close to the radio unit 53, have corresponding preambles 5a, 5d with no delay, i.e. $T_{delay}$=0. For mobile communication terminal 3c, the preamble 5c is received with a delay $T_{delay}$ of a size 8c. Meanwhile, for mobile communication terminal 3b, the preamble 5b is received with a delay $T_{delay}$ of a size 8b. It can here be seen how the sequence for the preamble 5b is identical to the first preamble 5a, except for the first 7 values, and will probably be detected as the first preamble 5a by the base station.

In other words, due to the size of the random access cell radius 7, it is difficult to distinguish mobile communication terminals 3a and 3b.

Figure 3A:
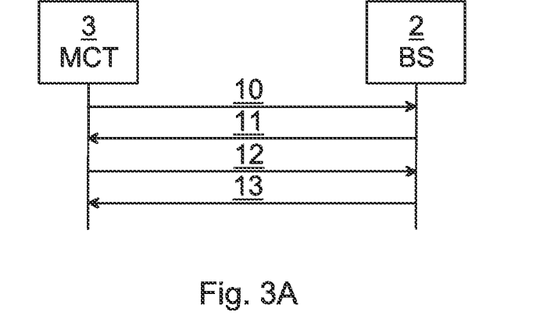
FIGS. 3A-C are sequence diagrams illustrating communication between a base station and a mobile communication terminal of FIG. 1.
Figure 3B:
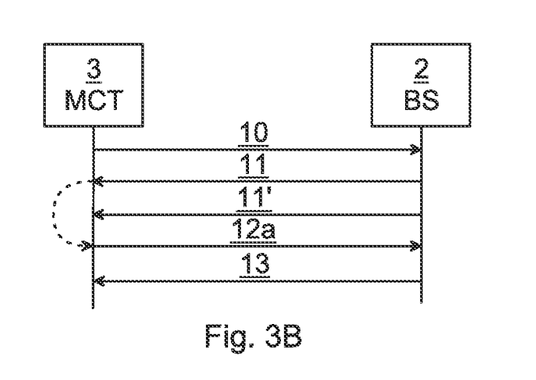
Figure 3C:
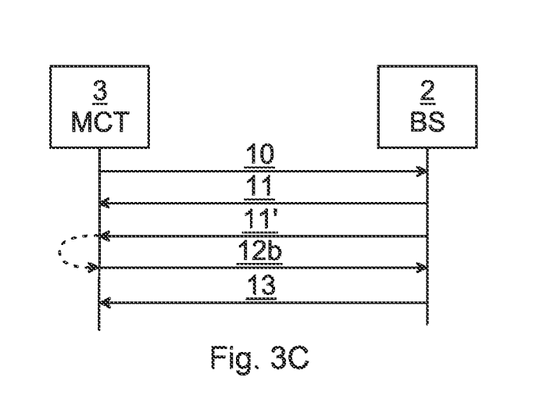

FIGS. 3A-C are sequence diagrams illustrating communication between a base station and a mobile communication terminal of FIG. 1.

In FIG. 3A, a sequence according to the LTE standard is shown. First, the mobile communication terminal 3 sends the preamble message 10 on the random access channel to the base station 2 (via the radio unit 53) with a Zadoff-Chu sequence corresponding to a RAPID selected by the mobile communication terminal 3.

The base station 2 responds with a Random Access Response 11 on DL-SCH (Downlink Shared Channel). The Random Access Response 11 contains RAPID, temporary identifier C-RNTI (Cell-Radio Network Temporary Identifier) and timing advance for the mobile communication terminal 3. If more than one mobile communication terminal sent a preamble, all mobile communication terminals receive the Random Access Response, but responds only to the one with the correct RAPID.

Subsequently, the mobile communication terminal sends a first Scheduled Transmission 12 on UL-SCH (Uplink Shared Channel). The first scheduled transmission contains the C-RNTI and an identifier of the mobile communication terminal 3.

At this point, the base station 2 sends a Contention Resolution message 13 comprising the identifier of the mobile communication terminal 3. The Contention Resolution message is addressed to the C-RNTI of the first scheduled transmission, and thus resolves the random access. In the case that more than one mobile communication terminal 3 having sent the same preamble, the procedure is only continued for the mobile communication terminal 3 with the matching identifier. The other mobile communication terminal will have to attempt to set up communication again using the random access channel.

In FIGS. 3B-C an embodiment is illustrated where, in addition to the regular Random Access Response 11, a Long Range Random Access Response Message 11' is sent, using the same method and protocol as the normal Random Access Response Message 11. As it is allowed to send responses to more than one preamble in the same sub frame, this is possible with existing standards.

The Long Distance Random Access Response 11' is identical to the Random Access Response 11 with an exception of the timing advance information and RAPID. These information fields are filled in assuming that the sending mobile communication terminal 3 was located outside the random access cell border, and thus with a round-trip delay larger than $N_{CS}*T$, see mobile communication terminal 3b and corresponding delay 8b of FIGS. 1 and 2. The Long Distance Random Access Response 11' includes a different temporary C-RNTI than the normal Random Access Response message 11.

In this case the roundtrip delay and sequence shift index is calculated with formulas:

$$v = \text{ceil}(j/N_{CS})+1$$

$$T_{delay} = (-j \bmod N_{CS})*T_S + N_{CS}*T_S$$

The timing advance and RAPID for the Long Distance Random Access Response 11' is then calculated in the same way as for the normal Random Access Message.

As illustrated in FIG. 3B, the mobile communication terminal 3 will normally, when inside the random access cell radius 7, answer the Random Access Response 11 and ignore the Long Range Random Access Response 11' as the RAPID of the Long Range Random Access Response 11' does not match the RAPID of the sent preamble.

But, as illustrated in FIG. 3C, if the mobile communication terminal 3 is outside the random access cell range, and thus had a roundtrip delay longer than $N_{CS}$, then the RAPID of the Long range Random Access Response 11' will match the RAPID of the sent preamble. The mobile communication terminal 3 will thus answer the Long Range Random Access Response 11' and use the timing advance in this message, which then will make sure the mobile communication terminal 3 performs correct compensation for the round trip delay when sending next message.

High Speed Cells

For high speed cells, i.e. cells with the high speed flag set, only a restricted set of preambles per root sequence are available, as described in chapter 5.7.2 of ref [1].

This means that for some received preambles, there is no alternative interpretation. These preambles can not be interpreted as another preamble delayed between $N_{CS}*2-1$ and $N_{CS}$ symbols. We call these preambles unambiguous preambles.

Every high-speed preamble v consist of the root sequence, shifted C(v) symbols, where C(v) is calculated from v (the preamble index) and the physical index of the root sequence u as described in ref [1] chapter 5.7.2.

An unambiguous preamble with index v is characterized by that the next preamble is not shifted exactly $N_{CS}$ symbols from v, that is C(v+1) C(v)+$N_{CS}$.

When an unambiguous preamble is received, no Long Distance Random Access Response 11' message is sent. For other preambles, Long Distance Random Access Response messages 11' are sent, just like the case for normal cells.

Figure 4A:
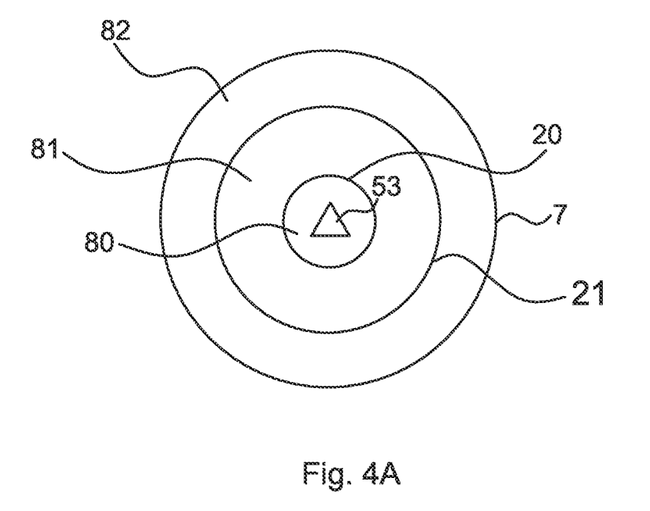
FIGS. 4A-B are schematic diagrams illustrating the use of various distances in embodiments presented herein.
Figure 4B:
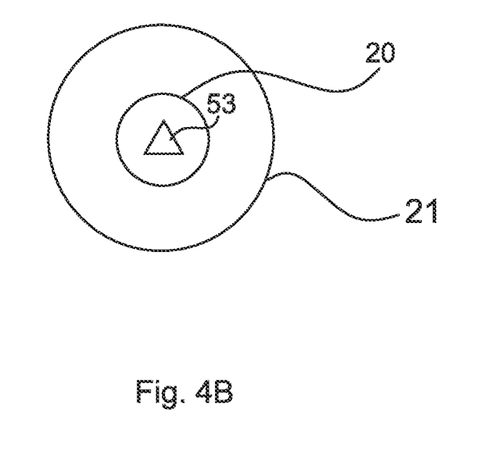

FIGS. 4A-B are schematic diagrams illustrating the use of various distances in embodiments presented herein. FIG. 4A shows an embodiment where there area three distances (radii) in relation to the radio unit 53. An inner threshold distance 20 and an outer threshold distance 21 are provided, along with a random access cell radius 7 effectively creating three concentric circles.

In FIG. 4B, the outer threshold distance 21 coincides with the cell radius 7.

Figure 5A:
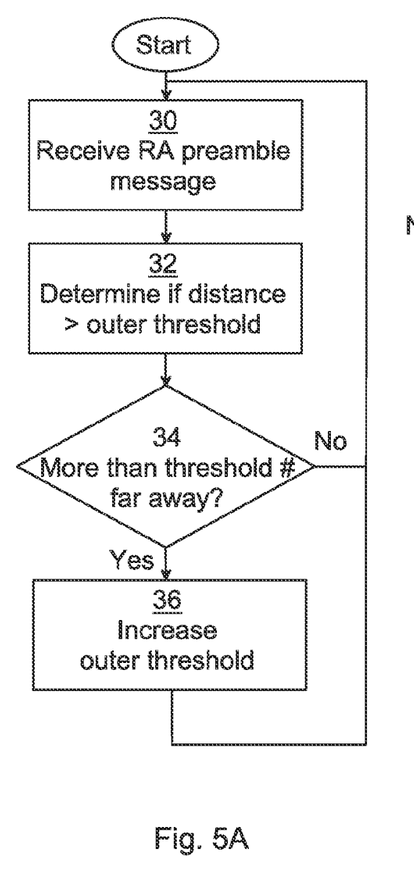
FIGS. 5A-B are flow charts illustrating methods performed in the base station of FIG. 1.
Figure 5B:
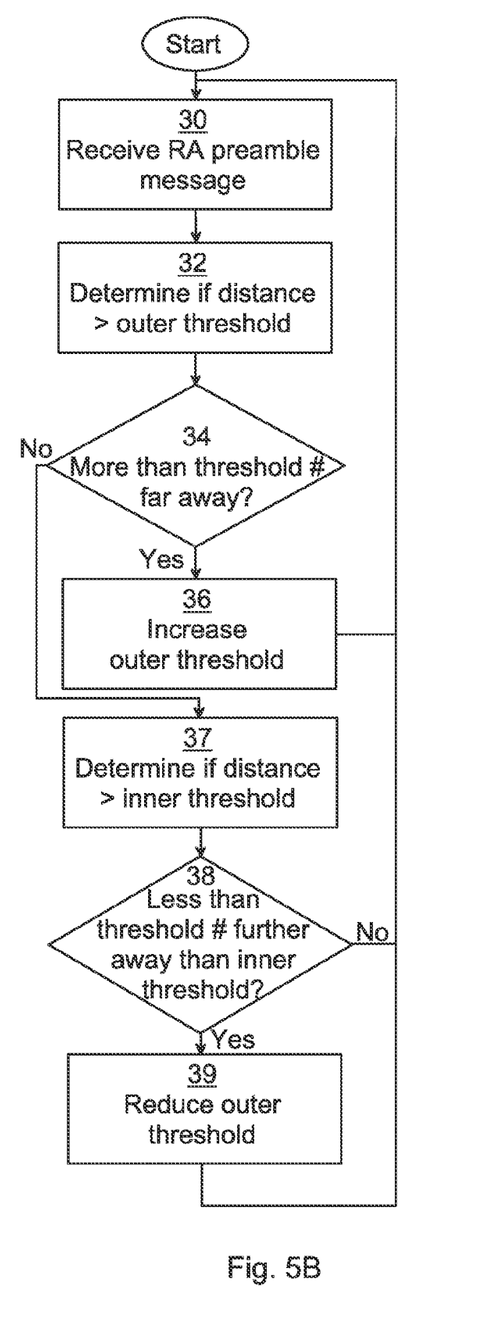

FIGS. 5A-B are flow charts illustrating methods performed in the base station of FIG. 1. The method will described with flow chart references of FIG. 5A and further references to FIG. 1 and FIGS. 4A-B.

In a receive RA (Random Access) preamble message step 30, the base station receives several random access preamble messages (10 of FIGS. 3A-C) over time, where each random access preamble message 10 comprises a respective preamble. Each valid preamble comprises a preamble sequence selected from a predefined number of preamble sequences being valid for the radio unit, and wherein all valid preamble sequences are cyclic shifts, with a multiple of a shift size being valid for the radio unit, of the root sequence for the radio unit.

In a determine if distance>outer threshold step 32, the base station determines for each received random access preamble message whether the corresponding mobile communication terminal is further away from the radio unit 53 than the outer threshold distance 21, which is collected in statistics. This is performed independently for each received random access preamble message.

In a conditional more than threshold # far away step 34, the statistics are analysed to determine whether there is more than a threshold magnitude of mobile communication terminals being further away than the outer threshold distance 21. This threshold magnitude can, for example, be expressed as a percentage or as an absolute number.

If the statistics indicate that the threshold is exceeded, the method continues to an increase outer threshold step 36. Otherwise, the method returns to the receive RA preamble message step 30. This step can be executed after each update to the statistics or in a separate process, e.g. periodically.

In the increase outer threshold step 36, the outer threshold distance 21 and the random access cell radius 7 of the radio unit 53 are increased.

In FIG. 5B a more extensive method is disclosed, comprising additional optional steps. A difference here is that if the statistics do not indicate that the threshold is exceeded in the conditional more than threshold # away step 34, the method continues to a determine if distance <inner threshold step 37.

In the determine if distance>inner threshold step 37, the base station determines for each random access preamble message whether the corresponding mobile communication terminal is further away than the inner threshold distance 20 from the radio unit 53, which is also collected in the statistics. This step can also be performed directly after the determine if distance>outer threshold step 32.

In a conditional less than threshold # further away than inner threshold step 38, the statistics are analysed to determine whether there is less than a threshold magnitude of mobile communication terminals being further away than the inner threshold distance 20. This threshold magnitude can, for example, be expressed as a percentage or as an absolute number.

If the statistics indicate that this threshold magnitude not exceeded, the method continues to a reduce outer threshold step 39. Otherwise, the method returns to the receive RA preamble message step 30.

In the reduce outer threshold step 39, the inner threshold distance 20, the random access cell radius of the radio unit 53 and the outer threshold distance 21 are reduced.

Figure 6A:
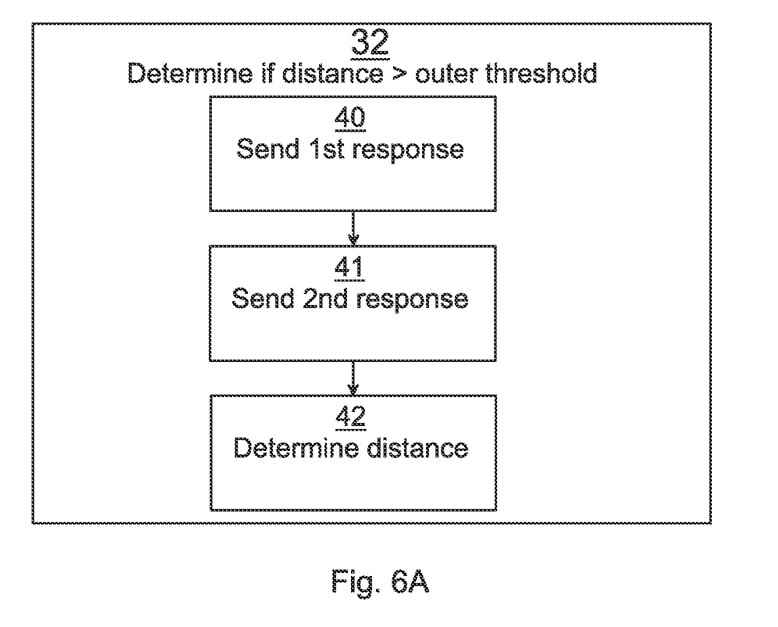
FIGS. 6A-B are block diagrams illustrating how a particular step in the method illustrated by FIG. 5A-B can be performed.
Figure 6B:
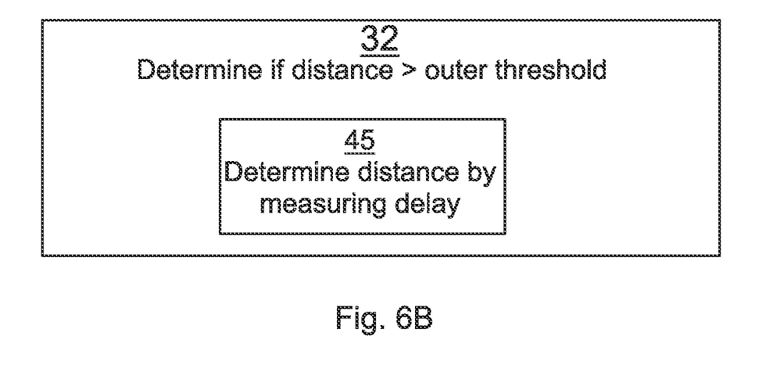

FIGS. 6A-B are block diagrams illustrating how a particular step in the method illustrated by of FIG. 5A-B can be performed.

In FIG. 6A, sub-steps according to the embodiment illustrated in FIGS. 3B-C are shown. The determine if distance>outer threshold step 32 here includes three sub-steps.

In a send 1st response step 40, as a response to each random access preamble message 10, the base station sends a first random access response message 11 comprising a first preamble identifier matching a preamble identifier of the preamble of the respective random access preamble message 10 when the respective mobile communication terminal is closer than the random access cell radius. In other words, the base station here assumes that the mobile communication terminal is within the random access cell radius.

In a send 2nd response step 41, as a response to the preamble messages (when the preambles are not unambiguous preambles), the base station sends the second response message 11', also known as the Long Range Random Access response, comprising a second preamble identifier matching a preamble identifier of the preamble of the respective random access preamble message 10 when the respective mobile communication terminal is further away than the cell radius. In other words, the base station here assumes that the mobile communication terminal is outside the random access cell radius. The preamble sequence of the second message can be shifted from the preamble sequences of the first by a number of symbols being the shift size $N_{CS}$.

In a determine distance step 42, the base station determines that that a respective mobile communication terminal is further away than an outer threshold distance 21 when the respective mobile communication terminal responds to the second response message 11'.

In FIG. 6B, a sub-step according to the embodiment of FIG. 4A is disclosed.

The determine if distance>outer threshold step 32 here includes one sub-step.

The determine distance by measuring delay step 45 includes determining the distance between the respective mobile communication terminal and the radio unit 53 by measuring a respective delay. This presumes that the cell radius 7 is larger than the outer threshold distance 21 as shown in FIG. 4A.

This defines three areas. An innermost area 80 stretches from the radio unit to the circle defined by the inner threshold 20. If there is traffic only in this area 20 and no traffic outside, this is an indication that the coverage of the cell is too large, and that the outer and inner thresholds can be decreased.

An intermediate area 81 is a ring with inner radius of the inner threshold and an outer radius of the outer threshold 21. Normally there is traffic in this area. This area 81 and the innermost area 80 should contain the entire practical coverage area of the cell.

An outermost area 82 stretches from the outer threshold 21 to the random access cell radius. This area is a margin area and there should be no or minimal traffic here. If there is significant traffic in the outermost area 82, this is an indication that the cell radius 7 should be increased. The reason that we need the outermost area to be a part of the cell, is that the base station otherwise will not detect a mobile communication terminal 3 outside the outer threshold and thus will not know that the cell coverage area needs to be increased.

Figure 7A:
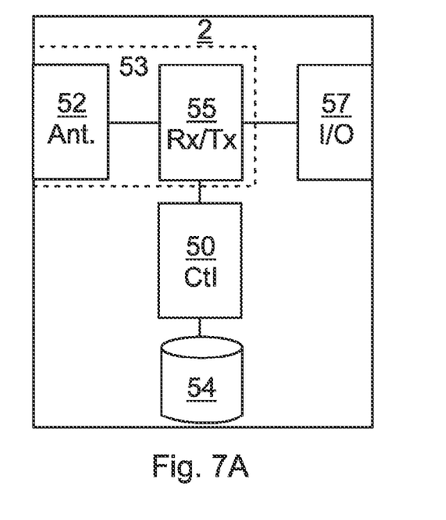
FIG. 7A is a schematic diagram showing some components of the base station of FIG. 1.

FIG. 7A is a schematic diagram showing some components of the base station 2 of FIG. 1.

A controller 50 is provided using any suitable central processing unit (CPU), microcontroller, digital signal processor (DSP), application specific integrate circuit etc., capable of executing software instructions stored in a computer program product 54, e.g. in the form of a memory. The computer program product 29 can be a memory or any combination of read and write memory (RAM) and read only memory (ROM). The memory also comprises persistent storage, which, for example, can be any single one or combination of magnetic memory, optical memory, or solid state memory or even remotely mounted memory.

The base station 2 also comprises an I/O interface 57 for communicating with other elements of the mobile communication network.

One or more radio units 53, co-located with or separate from other components of the base station 2, comprises a transceiver 55 and antenna 52 for radio communication with mobile communication terminals.

Figure 7B:
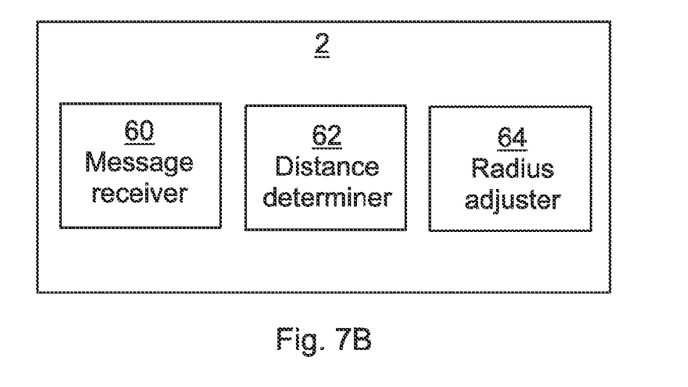
FIG. 7B is a schematic diagram showing functional modules of the registration server 4 of FIG. 1.

FIG. 7B is a schematic diagram showing functional modules of the base station 2 of FIG. 1. The modules can be implemented using hardware and/or software such as a computer program executing in the base station 2. All modules depend on an execution environment (not shown) which utilises the components shown in FIG. 7A. The modules correspond to steps of the method illustrated in FIGS. 5A-B.

A message receiver 60 is arranged to receive random access preamble messages on the random access channel.

A distance determiner 62 is arranged to, for each random access preamble message, determine whether the corresponding mobile communication terminal is further away than an outer threshold distance 21 from the radio unit 53. Optionally, the distance determiner is further arranged to, for each random access preamble message, determine whether the corresponding mobile communication terminal is further away than an inner threshold distance 20 from the radio unit 53, the inner threshold distance 20 being shorter than the outer threshold distance 21.

A radius adjuster 64 is arranged to, when it is determined that there is more than a threshold magnitude of mobile communication terminals being further away than the outer threshold distance 21, increase the outer threshold distance 21 and a random access cell radius 7 of the radio unit 53. Optionally, the radius adjuster can be further arranged to, when it is determined that there is less than a threshold magnitude of mobile communication terminals being further away than the inner threshold distance 20, reduce the inner threshold distance 20, the random access cell radius 7 of the radio unit 53 and the outer threshold distance 21.

The random access cell radius 7 can be adjusted, as explained above, using the shift size $N_{CS}$. This can also affect the outer threshold distance 21.

It is to be noted that the distance determiner and/or radius adjuster can optionally be located in a central location to allow these modules to be co-located for several or all base stations in the mobile communication network.

Figure 8:
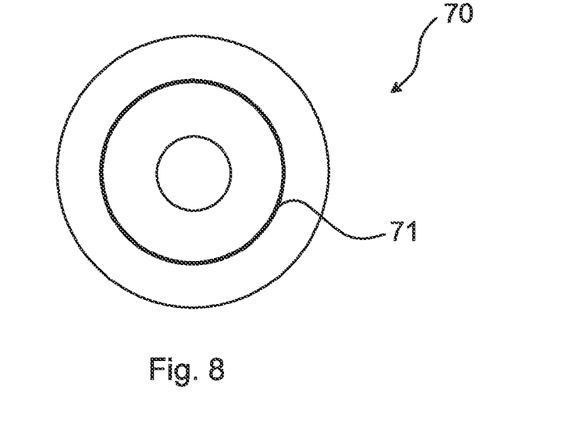
FIG. 8 shows one example of a computer program product 100 comprising computer readable means.

FIG. 8 shows one example of a computer program product 70 comprising computer readable means. On this computer readable means a computer program 71 can be stored, which computer program can cause a controller to execute a method according to embodiments described herein. In this example, the computer program product is an optical disc, such as a CD (compact disc) or a DVD (digital versatile disc) or a Blu-Ray disc. As explained above, the computer program product could also be embodied as a memory of a device, such as memory 54 of the base station 2. While the computer program 71 is here schematically shown as a track on the depicted optical disk, the computer program can be stored in any way which is suitable for the computer program product.

The invention has mainly been described above with reference to a few embodiments. However, as is readily appreciated by a person skilled in the art, other embodiments than the ones disclosed above are equally possible within the scope of the invention, as defined by the appended patent claims.

Reference

[1] 3GPP TS 36.211 3rd Generation Partnership Project; Technical Specification Group Radio Access Network; Evolved Universal Terrestrial Radio Access (E-UTRA); Physical Channels and Modulation

The invention claimed is:

1. A base station for improved random access, the base station comprising:
   a radio unit comprising a transceiver and an antenna;
   a message receiver configured to receive random access preamble messages from corresponding mobile communication terminals on a random access channel, each random access preamble message comprising a respective preamble;
   a distance determiner configured, for each random access preamble message, to determine whether the corresponding mobile communication terminal is farther away from the radio unit than an outer threshold distance, wherein the outer threshold distance is a random access cell radius of the radio unit; and
   a radius adjuster configured, if more than a threshold number of mobile communication terminals are farther away than the outer threshold distance, to increase the outer threshold distance and the random access cell radius of the radio unit.

2. The base station according to claim 1, wherein:
   the distance determiner is further configured, for each random access preamble message, to determine whether the corresponding mobile communication terminal is farther away from the radio unit than an inner threshold distance, the inner threshold distance being shorter than the outer threshold distance; and
   the radius adjuster is further configured, if less than a threshold number of mobile communication terminals are farther away than the inner threshold distance, to reduce the inner threshold distance, the random access cell radius of the radio unit, and the outer threshold distance.

3. The base station according to claim 1, wherein each preamble comprises a preamble sequence selected from a predefined number of preamble sequences valid for the radio unit, and wherein said valid preamble sequences comprise a root sequence cyclicly shifted by different multiples of a shift size, said root sequence and shift size valid for the radio unit.

4. The base station according to claim 3, wherein the distance determiner is configured to determine whether the mobile communication terminal is farther away than an outer threshold distance by:
   as a response to each random access preamble message, sending a first response message comprising a first preamble identifier matching a preamble identifier of the preamble of the respective random access preamble message when the respective mobile communication terminal is closer than the random access cell radius;
   as a response to at least part of said preamble messages, sending a second response message comprising a second preamble identifier matching a preamble identifier of the preamble of the respective random access preamble message when the respective mobile communication terminal is farther away than the random access cell radius; and
   determining that a respective mobile communication terminal is farther away than the outer threshold distance if the respective mobile communication terminal responds to the second response message.

5. The base station according to claim 1, wherein the distance determiner is configured to determine whether the mobile communication terminal is farther away than an outer threshold distance by:
   as a response to each random access preamble message, sending a first response message comprising a first preamble identifier matching a preamble identifier of the preamble of the respective random access preamble message when the respective mobile communication terminal is closer than the random access cell radius;
   as a response to at least part of said preamble messages, sending a second response message comprising a second preamble identifier matching a preamble identifier of the preamble of the respective random access preamble message when the respective mobile communication terminal is farther away than the random access cell radius; and
   determining that a respective mobile communication terminal is farther away than the outer threshold distance if the respective mobile communication terminal responds to the second response message.

6. A method implemented by a base station for improved random access, wherein said base station comprises a radio unit, wherein said radio unit comprises a transceiver and an antenna, and wherein said method comprises:
   receiving random access preamble messages from corresponding mobile communication terminals on a random access channel, each random access preamble message comprising a respective preamble;
   for each random access preamble message, determining whether the corresponding mobile communication terminal is farther away from the radio unit than an outer threshold distance, wherein the outer threshold distance is a random access cell radius of the radio unit; and
   if more than a threshold number of mobile communication terminals are farther away than the outer threshold distance, increasing the outer threshold distance and the random access cell radius of the radio unit.

7. The method according to claim 6, further comprising:
   for each random access preamble message, determining whether the corresponding mobile communication terminal is farther away from the radio unit than an inner threshold distance, the inner threshold distance being shorter than the outer threshold distance; and if less than a threshold number of mobile communication terminals are farther away than the inner threshold distance, reducing the inner threshold distance, the random access cell radius of the radio unit, and the outer threshold distance.

8. The method according to claim 6, wherein each preamble comprises a preamble sequence selected from a predefined number of preamble sequences valid for the radio unit, and wherein said valid preamble sequences are cyclic shifts of a root sequence for the radio unit.

9. The method according to claim 8, wherein at least part of the preamble sequences comprise the root sequence cyclicly shifted by different multiples of a shift size valid for the radio unit.

10. The method according to claim 9, wherein the random access cell radius is determined by the shift size.

11. The method according to claim 9, wherein determining whether the mobile communication terminal is farther away than an outer threshold distance comprises:
as a response to each random access preamble message, sending a first response message comprising a first preamble identifier matching a preamble identifier of the preamble of the respective random access preamble message when the respective mobile communication terminal is closer than the random access cell radius;
as a response to at least part of said preamble messages, sending a second response message comprising a second preamble identifier matching a preamble identifier of the preamble of the respective random access preamble message when the respective mobile communication terminal is farther away than the random access cell radius; and
determining that a respective mobile communication terminal is farther away than the outer threshold distance if the respective mobile communication terminal responds to the second response message.

12. The method according to claim 6, wherein determining whether the mobile communication terminal is farther away than an outer threshold distance comprises:
as a response to each random access preamble message, sending a first response message comprising a first preamble identifier matching a preamble identifier of the preamble of the respective random access preamble message when the respective mobile communication terminal is closer than the random access cell radius;
as a response to at least part of said preamble messages, sending a second response message comprising a second preamble identifier matching a preamble identifier of the preamble of the respective random access preamble message when the respective mobile communication terminal is farther away than the random access cell radius; and
determining that a respective mobile communication terminal is farther away than the outer threshold distance if the respective mobile communication terminal responds to the second response message.

13. The method according to claim 12, wherein each preamble comprises a preamble sequence selected from a predefined number of preamble sequences valid for the radio unit, wherein said valid preamble sequences are cyclic shifts of a root sequence for the radio unit, wherein at least part of the preamble sequence comprise the root sequence cyclicly shifted by different multiples of a shift size valid for the radio unit, and wherein the preamble sequences associated with second preamble identifier is shifted from the preamble sequence associated with the first preamble identifier by a number of symbols comprising the shift size.

14. The method according to claim 13, wherein determining whether the mobile communication terminal is farther away than an outer threshold distance is only performed for random access preamble messages comprising a preamble sequence that is the root sequence cyclicly shifted by a multiple of the shift size.

15. A computer program product stored on a non-transitory computer readable medium and comprising computer program code that, when run executed by a base station, improves random access to that base station, wherein the base station comprises a radio unit, wherein the radio unit comprises a transceiver and an antenna, and wherein the computer program code causes the base station to:
receive random access preamble messages from corresponding mobile communication terminals on a random access channel, each random access preamble message comprising a respective preamble;
for each random access preamble message, determine whether the corresponding mobile communication terminal is farther away from the radio unit than an outer threshold distance, wherein the outer threshold distance is a random access cell radius of the radio unit; and
if more than a threshold number of mobile communication terminals are farther away than the outer threshold distance, increase the outer threshold distance and the random access cell radius of the radio unit.

16. The computer program product according to claim 15, wherein the computer program code causes the base station to:
for each random access preamble message, determine whether the corresponding mobile communication terminal is farther away from the radio unit than an inner threshold distance, the inner threshold distance being shorter than the outer threshold distance, and
if less than a threshold number of mobile communication terminals are farther away than the inner threshold distance, reduce the inner threshold distance, the random access cell radius of the radio unit, and the outer threshold distance.

17. The computer program product according to claim 15, wherein each preamble comprises a preamble sequence selected from a predefined number of preamble sequences valid for the radio unit, and wherein said valid preamble sequence comprise a root sequence cyclicly shifted by different multiples of a shift size, said root seqeunce and shift size valid for the radio unit.

18. The computer program product according to claim 17, wherein the computer program code causes the base station to determine whether the mobile communication terminal is farther away than an outer threshold distance by:
as a response to each random access preamble message, sending a first response message comprising a first preamble identifier matching a preamble identifier of the preamble of the respective random access preamble message when the respective mobile communication terminal is closer than the random access cell radius;
as a response to at least part of said preamble messages, sending a second response message comprising a second preamble identifier matching a preamble identifier of the preamble of the respective random access preamble message when the respective mobile communication terminal is farther away than the random access cell radius; and
determining that a respective mobile communication terminal is farther away than the outer threshold distance if the respective mobile communication terminal responds to the second response message.

19. The computer program product according to claim 15, wherein the computer program code causes the base station to determine whether the mobile communication terminal is farther away than an outer threshold distance by:
- as a response to each random access preamble message, sending a first response message comprising a first preamble identifier matching a preamble identifier of the preamble of the respective random access preamble message when the respective mobile communication terminal is closer than the random access cell radius;
- as a response to at least part of said preamble messages, sending a second response message comprising a second preamble identifier matching a preamble identifier of the preamble of the respective random access preamble message when the respective mobile communication terminal is farther away than the random access cell radius; and
- determining that a respective mobile communication terminal is farther away than the outer threshold distance if the respective mobile communication terminal responds to the second response message.

* * * * *

UNITED STATES PATENT AND TRADEMARK OFFICE
CERTIFICATE OF CORRECTION

| | | |
|---|---|---|
| PATENT NO. | : 8,565,156 B2 | Page 1 of 1 |
| APPLICATION NO. | : 13/052528 | |
| DATED | : October 22, 2013 | |
| INVENTOR(S) | : Bergman | |

It is certified that error appears in the above-identified patent and that said Letters Patent is hereby corrected as shown below:

In the Specification

In Column 8, Line 17, delete "area" and insert -- are --, therefor.

In the Claims

In Column 13, Line 62, in Claim 13, delete "sequence" and insert -- sequences --, therefor.

In Column 13, Line 64, in Claim 13, delete "sequences" and insert -- sequence --, therefor.

In Column 13, Line 65, in Claim 13, delete "second" and insert -- the second --, therefor.

In Column 13, Line 66, in Claim 13, delete "sequence" and insert -- sequences --, therefor.

In Column 14, Line 34, in Claim 16, delete "distance, and" and insert -- distance; and --, therefor.

In Column 14, Line 44, in Claim 17, delete "sequence" and insert -- sequences --, therefor.

In Column 14, Line 45, in Claim 17, delete "root seqeunce" and insert -- root sequence --, therefor.

Signed and Sealed this
Twenty-second Day of July, 2014

Michelle K. Lee
*Deputy Director of the United States Patent and Trademark Office*